United States Patent [19]

Stetson et al.

[11] 4,436,419

[45] Mar. 13, 1984

[54] OPTICAL STRAIN GAUGE

[75] Inventors: Karl A. Stetson, Coventry; Irene R. Harrison, Manchester, both of Conn.

[73] Assignee: United Technologies Corporation, Hartford, Conn.

[21] Appl. No.: 349,238

[22] Filed: Feb. 16, 1982

[51] Int. Cl.³ .............................................. G01B 9/02
[52] U.S. Cl. .................................. 356/35.5; 356/349; 356/356
[58] Field of Search .................... 356/35.5, 347, 348, 356/349, 354, 355, 356

[56] References Cited

U.S. PATENT DOCUMENTS 3,914,056 10/1975 Mottier et al. ...................... 356/347

OTHER PUBLICATIONS

Dändliker et al. "High Resolutin Hologram Interferometry by Electronic Phase Measurement", *Optics Communications*, vol. 9. No. 4, pp. 412-416 12/73.
Dändliker et al., "Quantitative Determination of Bending and Torsion . . . ", *The Engineering Uses of Coherent Optics*, Cambridge U. Press, pp. 99-117, 1976.
Ineichen et al., "Accuracy and Reproducibility of Heterodyne Hobgraphic Interferometry", *Appl. of Holography & Opt. D. P.*, Jerusalem, Israel, pp. 207-212, 8/76.
Yamaguchi, "A Laser-Speckle Strain Gauge", *J. Phys. E. Sci-Instru.* vol. 14, No. 11, pp. 1270-1273, 11/81.

*Primary Examiner*—William L. Sikes
*Assistant Examiner*—Matthew W. Koren
*Attorney, Agent, or Firm*—Eric W. Petraske

[57] ABSTRACT

A noncontact optical strain gauge may be used for high temperature objects and objects having a small radius of curvature in the area of interest. The gauge works by means of interferometry applied to the speckle patterns of radiation reflected from two points on the object surface.

1 Claim, 2 Drawing Figures

OPTICAL STRAIN GAUGE

The Government has rights in this invention pursuant to Contract No. F-33615-80-C-2067 awarded by the Department of the Air Force.

DESCRIPTION

1. Technical Field

The field of the invention is that of an optical strain gauge.

2. Background Art

Present state of the art strain gauges employ electrical sensitive elements attached to the object being tested mechanically by means of an adhesive. The adhesive requires a strong mechanical bond and also requires a certain setting time. The adhesive is also subject to distortions during the curing process, is not available for use on high temperature objects and must be applied to a flat surface. An article entitled "A Laser Speckle Strain Gauge" by I. Yamaguchi in the Journal of Physics E, Vol. 14, Nov. 1981 discloses a system involving an optical strain gauge that employs a measurement of speckle displacement that is detected by cross-correlating signals from a diode array.

DISCLOSURE OF INVENTION

A noncontact optical strain gauge employs a pair of optical beams which illuminate two spots on the surface being tested. Diffusely reflected radiation from that surface passes through a recorded interference pattern exposed at zero strain, onto a pair of detectors, each of which is responsive to radiation from both the beams. A continuous phase change is introduced between the two illumination beams which causes a sinusoidal fluctuation in the light transmitted by each recording to each detector. The phase difference of the two detector signals is directly proportional to the strain.

BEST MODE FOR CARRYING OUT THE INVENTION

Figure 1:
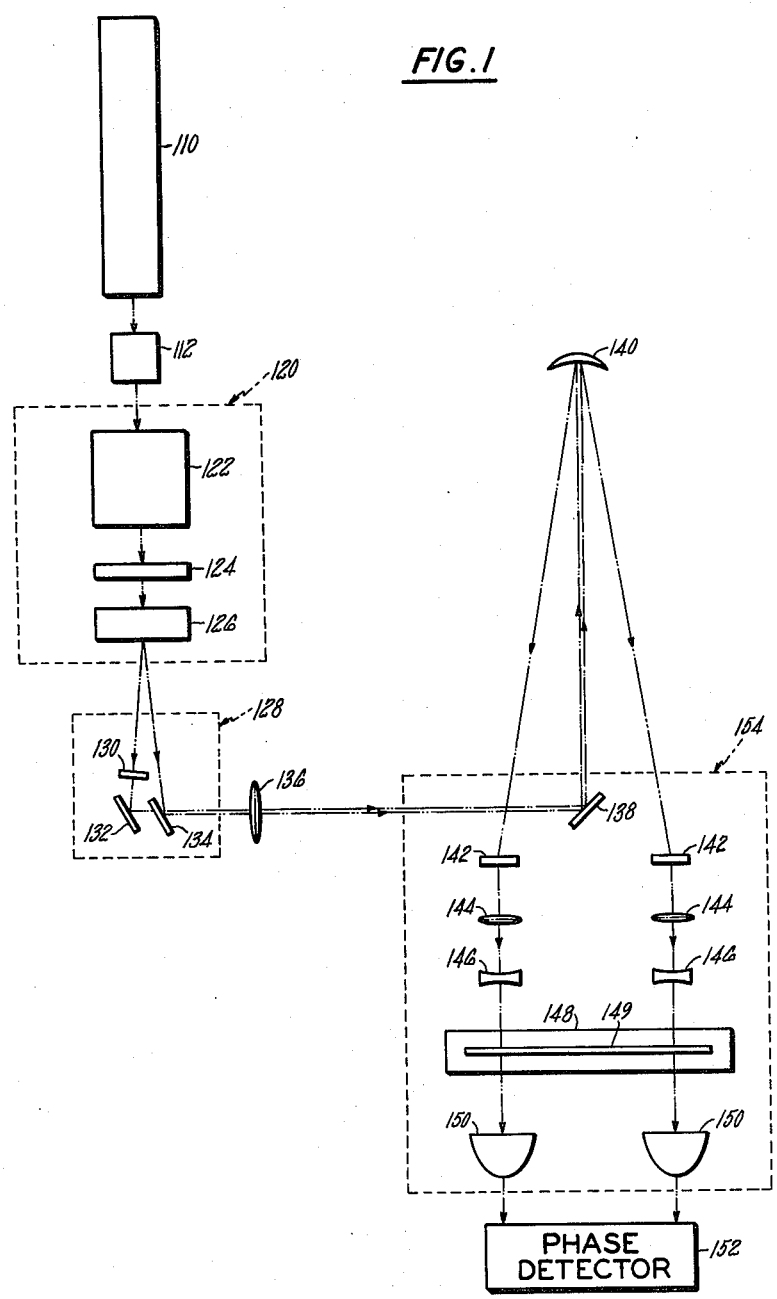
FIG. 1 illustrates an embodiment of the invention.

In FIG. 1, laser 110, illustratively a helium neon laser, generates a beam which passes through shutter 112 and through modulator unit 120. Within modulator unit 120, rotating half-wave plate 122 rotates at a fixed frequency f to modulate the beam. The result of this modulation is a polarized beam whose plane of polarization rotates at a frequency 4f. This rotating beam can be represented as the sum of two circularly polarized beams, right and left hand circularly polarized beams of differing frequency, one above and one below the original frequency by the amount 2f. These combined colinear beams pass through quarter-wave plate 124, the axis of which is set at an angle of 45° with respect to the vertical. Emerging from quarter-wave plate 124 there is a pair of colinear plane polarized beams having their planes of polarization at right angles to one another. These two beams pass through Wollaston prism 126 which separates them by a predetermined angle. The two beams are recombined by beam combiner 128 in which one beam passes through half-wave plate 130 which rotates its plane of polarization so that the planes of polarization of both beams are now parallel. The two beams are combined by mirror 132 and beamsplitter 134 which are offset and tilted in such a manner that two parallel, slightly separated beams emerge. The two beams are focused by lens 136 onto test object 140, being reflected off mirror 138.

Test object 140, having a rough surface, reflects radiation diffusely in a speckle pattern. A fraction of the reflected radiation from both points of illumination on the test object passes through wedge prisms 142 and then through converging lenses 144 and diverging lenses 146. The combination of lenses and their spacing is chosen so that the Fourier transform planes of the combined lens are in predetermined positions. Because of the lateral separation of the two points of illumination of the incident beams, there will be a linearly varying phase difference between the scattered radiation from each of these two points at the recording plane 149, where the radiation is the Fourier transform of the radiation scattered from test object 140, and an interference pattern, referrred to as a moire interference pattern, may be recorded. When the test object is strained, the spatial frequency of the fringes in the moire pattern will change. If a recording at zero-strain is made, the interference pattern at non-zero strain will have a different spatial frequency and some radiation from a non-zero strain interference pattern will pass through a zero-strain recorded interference pattern, the amount of radiation being transmitted being dependent on the strain. The radiation passes through recorded pattern 149 contained within vessel 148, then to detectors 150. Modulation of the incident beams improves the interferometric strain measurement by permitting heterodyne analysis techniques.

During operation, plate 122 rotates at an angular frequency of f so that the phases of the two beams change sinusoidally with a frequency 4f, as do the interference patterns. Each detector will produce a beat frequency of 4f caused by the heterodyne effect of the two beams illuminating the recording in front of it. At zero stress on test object 140, the interference pattern on recording 149 will match the recorded interference pattern and the phase difference of the two detector signals will be zero. As stress is applied to object 140 and it is strained, the pattern of reflected light will change. The two reflected beams will be affected unequally by this change so that the interference in film plane 149 will change and thus the phase of the detector signal will change. Each detector 150 will see an altered beat signal having the same frequency as before but a differing phase dependent on the strain. The phase difference between the detector beat signals will be proportional to the strain of oject 140 multiplied by a geometric constant. Commercial phase difference circuits are readily available that can measure this phase difference to less than one part in a thousand.

Figure 2:
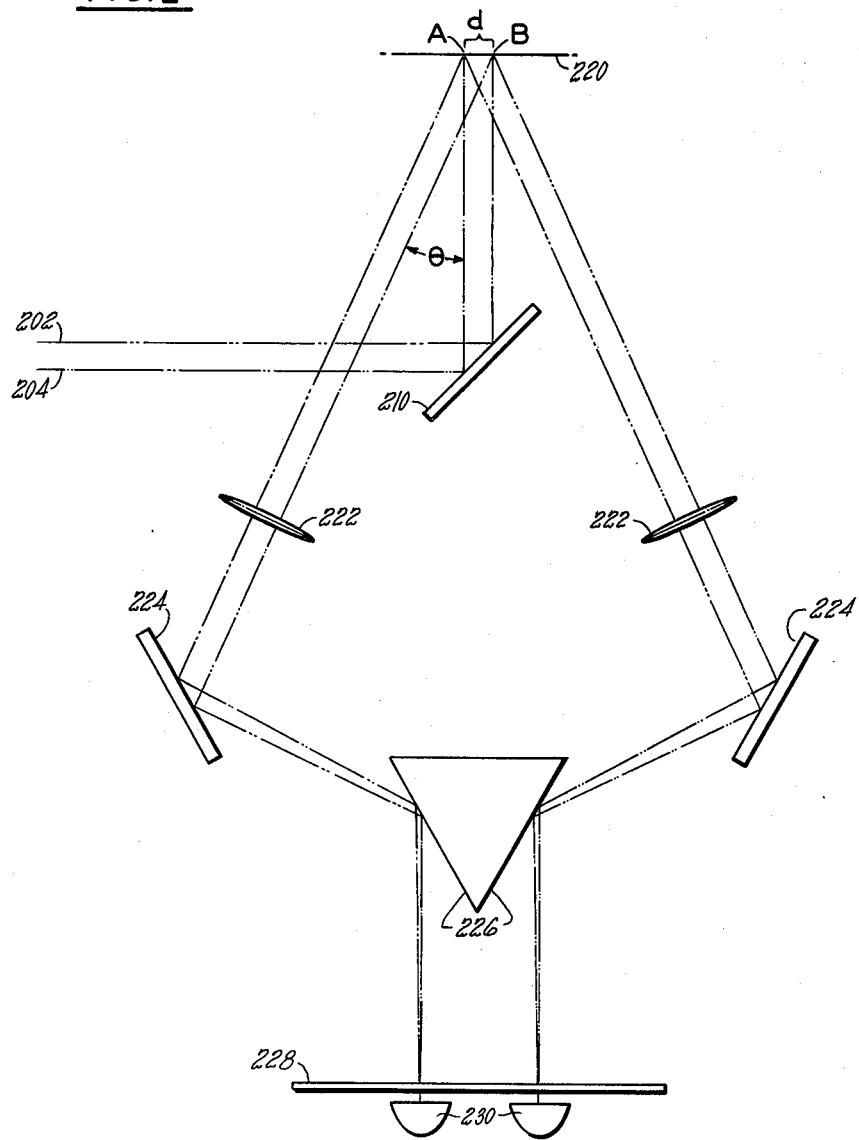
FIG. 2 illustrates a portion of an alternative embodiment of the invention.

Operation of the sensing head 154 may be seen in more detail in FIG. 2, which discloses an alterate form of the sensing head. Beams 202 and 204 are the incident parallel beams of different frequency. They illuminate the object having a surface 220 at points A and B, respectively, separated by distance d. The two beams reflect in a diffuse speckle pattern a portion of which enters lenses 222 which is positioned to intercept radiation coming at an angle theta with respect to the incident beam. Radiation passing through lenses 222 is deflected by mirrors 224 and 226 through recorded interference pattern 228 onto one of detectors 230. Both sides of the sensing head are symmetric. The strain $\epsilon = (\phi/360)(\lambda/2d \sin\theta)$, where $\phi$ is the phase difference between the signals from the two detectors, $\lambda$ is the wavelength of the light being used, d is the separation of the two points of illumination of the incident beams on the test object and $\theta$ is the angle between the path of radiation intercepted by the sensing head and the normal to the surface of the test object.

For system parameters of $\lambda = 0.633$ nm, $\theta = 30°$ and error in measurement of the angle of $10^{-3}$, the strain resolution is $\Delta\epsilon = 0.633$ micro strain per millimeter gauge length. The range of measurements may be estimated by applying a rule of thumb that the displacement of the object surface under one illuminated spot should not exceed one-fifth of the spot diameter. Thus, the maximum range is approximately given by the quantity S/5d where S is the spot diameter and d is the gauge length. If the illuminated spots are 0.1 millimeters in diameter, the maximum strain will be 20,000 micro strain per millimeter gauge length.

The measurements are affected by rotation, a rule-of-thumb being that the rotation should shift the speckle pattern that falls on the recording plane by less than 1/5 of a characteristic speckle diameter; the maximum allowed rotation being about $\lambda/5S$. For the foregoing parameters, the limiting rotation is 1.2 milliradians, independent of the distance d between points of illumination A and B.

In the illustrative embodiment, the recorded interference pattern was processed by the conventional technique of in-situ development, the developing chemicals being passed through tank 148, so that the film is not moved. It is not necessary that the polarization planes be oriented in combiner 128 and other methods of producing sufficient overlap for interference will be evident to those skilled in the art. The value of f was chosen for convenience such that $4f = 155$ Hz.

Object 140 in FIG. 1 is shown as having a curved surface to illustrate a highly advantageous feature of the invention compared with electrical strain gauges that require a flat surface for attachment. Another advantage of this invention is rapid set-up or attachment time. With in-situ photographic processing, relocation time is approximately six minutes, compared with periods of hours required for adhesive curing of electrical gauges. Another advantage of this noncontact gauge is that it may be used with objects that are inaccessible and/or too hot to attach electrical gauges.

We claim:

1. An optical system for measuring strain in a test object comprising:
   means for generating first and second optical beams having first and second frequencies;
   means for directing said first and second beams on said test object;
   at least two means for focusing radiation of said first and second frequencies diffusely reflected from said test object onto a focus plane;
   a predetermined moire interference pattern recording positioned in said focus plane to intercept said focused radiation, said moire pattern representing an exposure when the amount of said strain is zero;
   at least two detectors responsive to radiation focused by said at least two means for focusing for generating electrical signals in response to radiation of said first and second frequencies impinging thereon, said electrical signals having first and second phases;
   means for measuring the phase difference between said first and second phases of said electrical signals to form a representation of said strain.

* * * * *